Aug. 12, 1930. S. EINSTEIN 1,772,932
GRINDING MACHINERY
Filed May 23, 1927 2 Sheets-Sheet 1
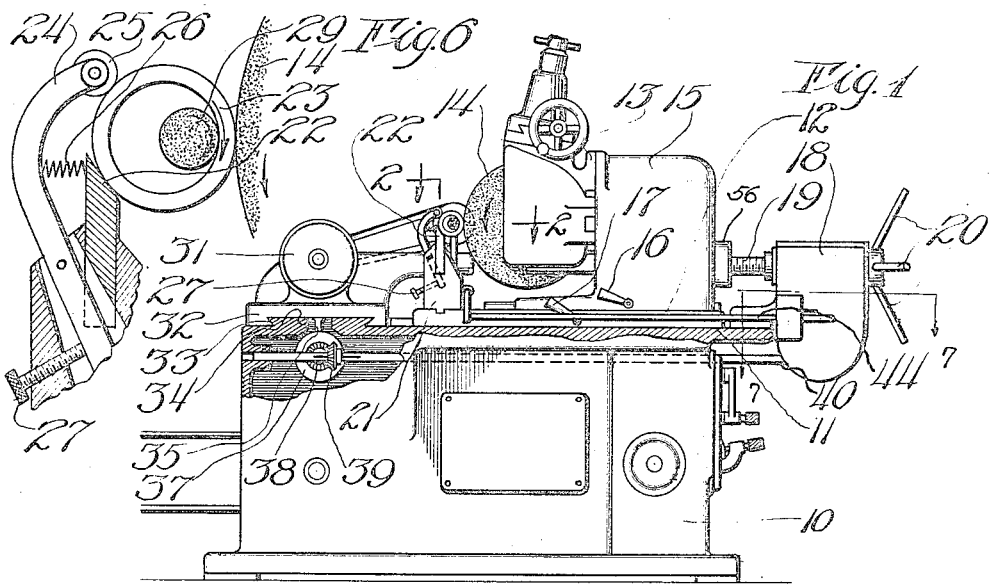
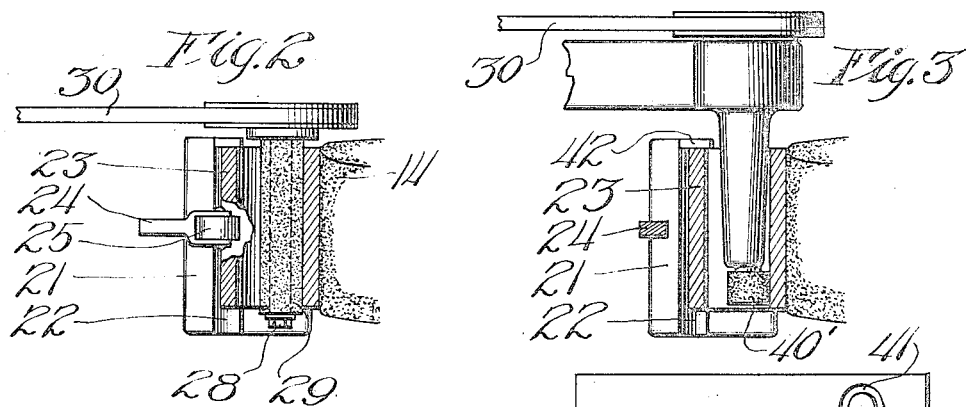
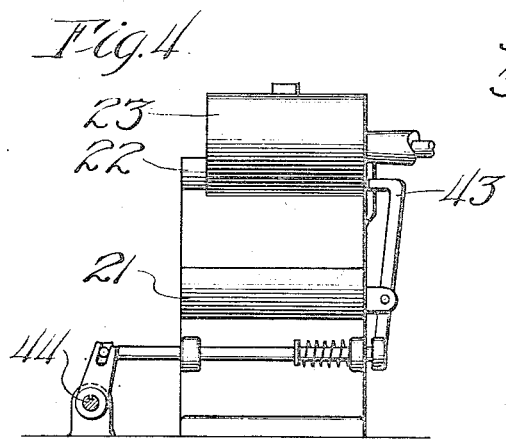
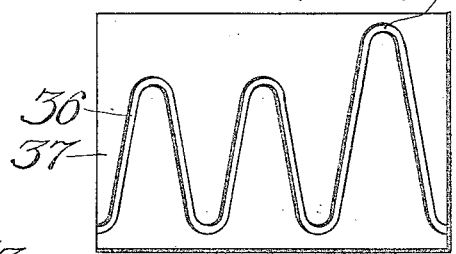
Inventor
Sol Einstein
By A. K. Parsons
Attorney Aug. 12, 1930.                S. EINSTEIN                1,772,932
                           GRINDING MACHINERY
                           Filed May 23, 1927            2 Sheets-Sheet 2

Inventor
Sol Einstein

By H. K. Parsons
        Attorney

Patented Aug. 12, 1930

1,772,932

UNITED STATES PATENT OFFICE

SOL EINSTEIN, OF CINCINNATI, OHIO, ASSIGNOR TO CINCINNATI GRINDERS INCORPORATED, OF CINCINNATI, OHIO, A CORPORATION OF OHIO

GRINDING MACHINERY

Application filed May 23, 1927. Serial No. 193,518.

This invention relates to improvements in grinding machinery and more particularly to a machine for operation upon hollow or tubular articles such as bushings, bearing races and the like for production of articles having uniform wall thickness or with inner and outer surfaces in concentric relation one to the other.

Numerous difficulties have been experienced in the production of articles of this nature in the past and the commercial permissible tolerances as to wall thickness and concentricity variances have been greater than the tolerances permissible in connection with ordinary cylindrical grinding. This has been necessarily imposed on the articles by prior art methods and mechanisms for the manufacture of such articles which have entailed the use of a chuck or the like in which the work is positioned with the possibility of initial locating error due to variance in engagement of the clamping portions or fingers of the chuck therewith. In the grinding of the interior of the articles for example, additional manufacturing difficulties have been experienced due to the supporting spindles for the chucks having slight play, vibrations or slight eccentricity which in some instances tend to counter-act the initial error in positioning of the work or in other cases increase the general eccentric relationship or variations between the axis of the outer curvature and that of the inner curvature to be generated or produced thereon.

It is to be understood that reference is here made to precision grinding which involves ordinarily a grinding to within limits measurable by tenths of a thousandth of an inch and consequently where utmost accuracy in producing mechanism is involved and in which unequaled disposition of bearing loads or the like resulting in early failure of the races, bearings or the like for example may result if the articles are eccentric beyond such limits, real precision grinding being therefore of prime importance.

Due to the variable factors of location of the work within the chuck and of eccentric rotation of the chuck in the past it has been impossible in the utilization of known internal grinding machines to grind a series of work pieces as for example with a roughing cut or rough finish and subsequently to replace the work pieces in corresponding position within the same or a similar chuck for an accurate, concentric final or finishing cut of a fractional thousandths of an inch to produce the desired finished article.

Similarly, it has been impossible to perform the initial grinding in one machine and subsequently transfer the pieces to a different machine as they would be found to run out of true as respects the second grinding wheel.

This has necessitated various compromises from standard grinding practice in that use has been made of a wheel neither the correct grade for heavy roughing cuts nor of the best grade for final finishing cuts with intermediate truing of such a wheel between operations, or has required the use of a plurality of wheels successively introduced into the work with a single chucking thereof in order that the work might be roughed and finished to the axis which had been determined by its chucked position which at best was only an approximation of the axis of the surface engaged by the retaining chuck.

It is the purpose and object of the present invention to obviate the difficulties experienced in the commercial production of articles of this nature on prior known mechanisms and to provide a machine which may be utilized to generate a surface of revolution on a work piece, such for example as the interior or bore thereof, in accurate concentric relation to the outer surface of the work and with a uniformity of radial wall thickness at all points on the work hitherto impossible of commercial accomplishment.

A further object of the present invention is the provision of improved mechanism for the production of articles of the nature aforesaid which will automatically accurately position the successive individual work pieces in exact corresponding relation and will permit of removal and replacement of the work pieces as often as desired in said exact definite position for grinding, rendering it possible to perform successive operations on the work piece either in the same machine or in different corresponding machines without in any way imparing the accuracy of the finished product or necessitating undue stock removal by the final finish grinding wheel.

Another object of the invention is the provision of a machine eliminating the use of chucks or the like and the consequent time normally consumed in chucking and unchucking operations and which will consequently greatly reduce the idle or non-grinding time of the machine and corresponding by increase the unit production thereof.

A further object of the invention is the provision of a machine capable of employment with minimum liability of injury to the operator in that it permits of automatic or other withdrawal of the completed work in a direction away from the high speed grinding wheel instead of in the direction thereof as has been customary in prior art mechanisms at the same time minimizing necessary relative movements of the grinding wheel and work holder and further reducing idle non-productive time of the machine.

A further object of the invention is the provision of an improved machine in which the several operations of work positioning, rotation, grinding, release and ejection are capable of automatic performance whereby the effort and attention required from the operator are minimized and the accuracy of finished product automatically attained.

An additional object of the present invention is the provision of improved means for supporting and insuring proper positioning and rotation of the individual work pieces prior to the inception of grinding thereof and proper maintenance of their position in the machine during their performance of the grinding operation.

Certain embodiments of a machine for accomplishing the desired results and objects as above specified are illustrated in the accompanying drawings, but it will be understood that any modifications in the specific structural details hereinafter described may be made within the scope of the appended claims without departing from or exceeding the spirit of the invention.

Figure 1 is a side elevation of a machine embodying the present invention with parts broken away.

Figure 2 is a substantially horizontal sectional view thereof taken as on the line 2—2 of Figure 1.

Figure 3 is a similar view of a slightly modified structure.

Figure 4 is a view in elevation of the work rest member and associate parts showing the grinding spindle in operative position.

Figure 5 is a development of the control cam as employed in connection with the structure particularly illustrated in Figure 3.

Figure 6 is a fragmentary enlarged view of the work and grinding throat.

Figure 7:
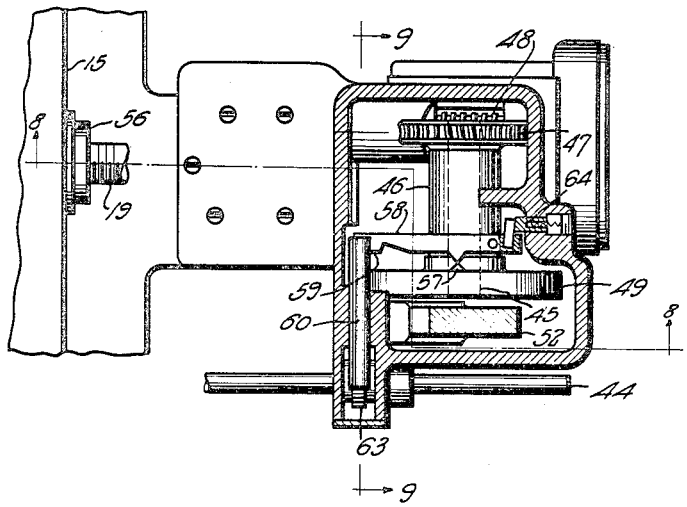
Figure 7 is a transverse section through the automatic control mechanism for the machine taken as on line 7—7 of Figure 1.

In the drawings the numeral 10 designates the base of a grinding machine of the general centerless type, having a longitudinally extending guideway 11 for slide 12 on which in turn is slidably supported the regulating wheel supporting frame 15. To this frame is pivoted the regulating wheel housing 13 bearing the regulating wheel 14. A hand clamp 16 serves when desired to lock members 12 and 15 together to move as a unit while handle 17 controls clamping of slide 12 to bed 10, in which event the regulating wheel mechanism may be allowed to reciprocate or move back and forth with respect to the said intermediate slide.

Carried by the bed 10 is control bracket 18 containing suitable mechanism for reciprocating screw 19 and thus the member 15 and associate parts.

Figure 8:
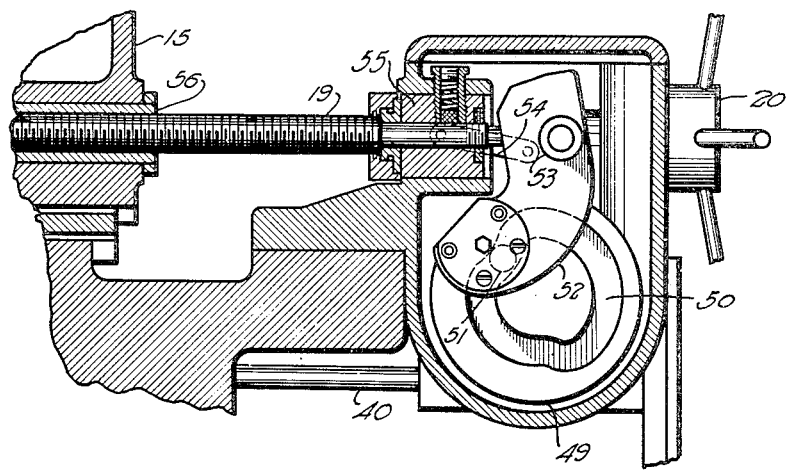
Figure 8 is a vertical section showing the control cam and associate parts in elevation as on line 8—8 of Figure 7.
Figure 9:
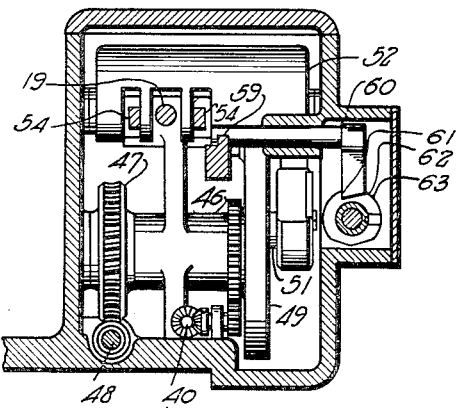
Figure 9 is a fragmentary section illustrating the coupling of the cam actuated trip rod with the ejector shaft on line 9—9 of Figure 7.

An embodiment of this mechanism is particularly illustrated in Figures 7 to 9 inclusive and comprises a transverse shaft 45 bearing a sleeve 46 having at one end a worm gear 47, rotatable through a suitably driven worm 48, and at the opposite end a cam disc 49. This disc has in its face the cam groove 50 engaging roller 51 on rock arm 52 pivoted at 53 to bracket 18. This arm is coupled by linkage 54 with slide block 55 having journaled therein the adjusting screw 19 rotatably engaged in nut 56 carried by frame 15. Screw 19 is provided with a pilot wheel 20 whereby the position of the unit 15 may be varied with respect to the slide block 55. In addition, rotation of cam 50 through oscillation of lever 52 causes a reciprocation of the block and consequent in and out movement of the regulating wheel slide to vary the position of the regulating wheel slide to vary the position of the regulating wheel for operation of the machine as hereinafter described.

Cam disc 49 is further provided with a cam projection 57 cooperating with rock lever 58 coupled by lug 59 with actuator plunger or rod 60. This rod has a toothed terminus 61 for engagement in notch 62 of collar 63 secured on the ejector operating shaft 44.

It will be understood that rotation of cam 49 through engagement of roller 51 in cam track 50 will cause successively a relatively rapid decrease in the work receiving throat or space between the grinding wheel 29 and work regulating wheel 14, a decelerated relative movement of said parts causing proper feed for stock removal, preferably a dwell, for what may be termed a "sparking out" in the grinding of the work and a subsequent separation of the grinding and regulating wheels at the completion of the grinding operation, this cycle being repeated for each work piece. The position of lug 57 is such that at a proper point in the cycle the lug will swing the inner end of lever 58 inwardly against the action of the spring pressed plunger 64, correspondingly shifting plunger 60 to rock shaft 44 in a clockwise direction as viewed in Figure 4. This oscillation of the shaft renders ejector 43 operative to eject the finished work piece.

Carried by the inner end of slide 12 and therefore adjustable either with or with respect to the regulating wheel is work rest racket 21 supporting the angle top work rest blade 22 which is inclined in the direction of the regulating wheel, so that with this wheel it forms a V-shaped trough to receive the bushings or other work pieces 23.

Pivoted to bracket 21 adjacent the work rest blade is an arcuate arm 24 bearing a work engaging roller or rollers 25 urged by spring 26 in the direction of the work piece to an extent limited by stop screw 27. By reference to the drawings it will thus be seen that when a work piece is placed on the work rest blade 22 it will be urged by gravity in the direction of the operative face of the regulating wheel 14 and in addition will be held down into the throat by pressure of roller 25, particularly as the regulating wheel is moved inward toward the work rest bracket and blade just prior to inception of the grinding operation. This insures sufficient friction contact between the regulating wheel and work piece so that a proper rotative movement will be imparted to the work piece prior to the engagement of the grinding wheel therewith and at the same time the work will be properly steadied in position in the throat for engagement by the grinding wheel. At the same time stop 27 limits the pressure movement of roller 25 so that the pressure will be relieved as the regulating wheel is withdrawn and there will be no retardent friction interfering with proper ejection or discharge of the work piece from the machine.

Referring to the mechanism for grinding the work, in Figure 2 there has been indicated a spindle member 28 bearing elongate cylindrical grinding wheel 29 of length greater than the length of the work piece being operated on. This grinding member fits interiorly of the work piece and at a definte position with respects the work supporting blade 22. It is suitably driven as by belt 30 from motor 31, the entire structure being supported by a slide 32 mounted on the transverse guide 33 of base 10. Base 10 is preferably slotted as at 34 to allow movement of pin 35 which engages cam track 36 of barrel cam 37 mounted in base 10. A driven gear 38 is driven by the driving gear 39 on shaft 40. This shaft extends longitudinally of the base and derives its power from any suitable source, but preferably from a slowly rotating member in the regulating wheel control bracket 18, so that the rotation of the cam and thus the oscillation of the grinding wheel bracket and associate parts will be in proper timed relation to the automatic in and out movements of the regulating wheel.

As an alternative form the grinding wheel may be a short one 40' as shown in Figure 3 for example, in which event it is necessary to impart a sufficient back and forth throw to the wheel that it may properly traverse the entire interior of the work equally during the grinding operation. This is accomplished it will be understood by a variation in the cam track 36. In any event, however, the track preferably has a pronounced throw as at 41 which will entirely withdraw either wheel 29 or wheel 40' from operative position within the work to facilitate removal and replacement thereof.

In the operation of my improved internal grinder the regulating wheel is rotated at a slow rate of speed and is shown with its operative surface moving downwardly or in a direction toward the work supporting rest as indicated by the arrow in Figures 1 and 6 for example. To facilitate introduction of a work piece in grinding position within the machine it is desirable that the grinding wheel and regulating wheel be suitably separated and to a distance greater than the thickness of the wall of the work piece to be operated upon. In the particular mechanism chosen for purposes of illustration, the regulating wheel is withdrawn a suitable distance from the work supporting bracket and the work piece axially shifted inward until it engages the stop 42 adjacent work rest blade 22. At this time the grinding wheel may either project idly in the central portion or bore of the work or may be laterally displaced therefrom as preferred. The work piece having been introduced it will rest against the regulating wheel 14 being pressed downward against the work rest thereby and the frictional engagement between the two parts will impart a constant and uniform rotation to the work. It will be understood that the regulating wheel is operated at a slow rate of speed such as to impart the proper surface speed to the work in its movement past the operative face of the grinding wheel and that its axis may be disposed either parallel with the work or at a slight angle to produce a feeding component urging the work in the direction of stop 42. The frictional engagement between the regulating wheel and the exterior of the work is accentuated particularly as the regulating wheel is moved inwardly by the resilient pressure of the roller or rollers 25.

It will be understood in this type of grinding that it is essential that the inner and outer surfaces of the work be absolutely concentric and the wall of even thickness, so that the interior diameter is correct to a fractional thousandth of an inch. My new process therefore contemplates first finishing the exterior of the work piece 23 to proper diameter as by the thru-feed grinding method in an ordinary commercial centerless grinder. After the exterior has been thus accurately rounded up and finished the work piece may be interiorly ground on the present machine. During such grinding the regulating wheel with its rigid or non-yielding surface engages the previously ground exterior of the work and serves in conjunction with the work rest accurately to position the work in the machine. The grinding is effected by a relative movement of the grinding and regulating wheels one toward the other which movement may be jointly effected. Inasmuch as the work is accurately positioned by the members engaging its exterior and held against yielding the interior shape as produced by the grinding wheel will be entirely dependent upon the relation of the grinding wheel to the exterior work positioning members. In the form of mechanism illustrated the grinding and regulating wheels are located in direct opposition one to the other. The final thickness of the cylindrical wall will therefore be that of the distance between operative grinding and regulating wheels surfaces as indicated for example in Figure 2 and since the regulating wheel is non-yielding and engages the outer periphery of the work and the work itself must pass between the grinding and regulating wheels the work will be ground to a uniform wall thickness causing its interior or bore to be exactly concentric with the outer surface and not subject to variations in concentricity such as occur when dependance is placed on work holding chucks and on the accuracy of the bearings or supports for such chucks as has been customary with prior art mechanisms.

As has been mentioned the grinding wheel reciprocates back and forth or oscillates within the work piece during the grinding to equalize the wear on the wheel and prevent accidental formation of grooves or the like by abrasive particles on the wheel. At the completion of the grinding the regulating wheel is withdrawn opening up the throat and allowing the work to move free of the grinding wheel which may be withdrawn from the work or not as desired. In any event, an ejector 43 is preferably employed to axially shift the work out of the grinding throat. This ejector may be either hand operated or may be coupled with rock shaft 44 which extends into the regulating wheel control bracket 18 for automatic actuation on the opening up of the grinding throat.

From the foregoing description taken in connection with the accompanying drawing, the construction and operation of my improved internal grinder should be readily understood and it will be seen that there has been provided a work rest in which the work piece may be quickly introduced and withdrawn without the necessity of a pronounced retracting movement of the grinding wheel in which the work automatically positions or locates itself by the previously ground exterior surface thereof; in which a uniform thickness of wall is quickly and accurately produced. The initial rotation of the work is positively insured through means definitely establishing the frictional engagement between work and regulating wheel prior to engagement of the grinding wheel with the work, and in which the work pieces may be satisfactorily ejected or removed from the machine without danger to operator thereof.

I claim:—

1. A machine for precision grinding of the interior surface of a ring tube or the like including a work rest adapted to engage the outer surface of the article and support the same for free rotation upon said surface and an opposed regulating wheel having its operative surface moving in the direction of said work rest, said regulating wheel being disposed to engage the outer surface of the work piece and control the rotative movement of the work on the work rest, a grinding member disposed intermediate said wheel and rest for internal engagement with the work piece and means for relatively shifting the regulating wheel and the grinding member to bring the grinding member and the work into operative engagement.

2. An internal grinder including a work rest and an opposed regulating wheel having its operative surface moving in the direction of said work rest, a grinding member disposed intermediate said wheel and rest for internal engagement with the work piece, means for relatively shifting the regulating wheel and the grinding member to bring the grinding member and work into operative engagement and means for reciprocating the grinding wheel and work one relative to the other during the grinding operation.

3. An internal grinder including a work rest and an opposed regulating wheel having its operative surface moving in the direction of said work rest, a grinding member disposed intermediate said wheel and rest for internal engagement with the work piece, means for relatively shifting the regulating wheel and the grinding member to bring the grinding member and work into operative engagement, means for reciprocating the grinding wheel and work one relative to the other during the grinding operation, and means for relatively axially separating the grinding wheel and the work at the completion of said operation.

4. A machine for precision formation by grinding of the inner surface of a ring tube or the like, including a work rest and an opposed regulating wheel forming a work receiving throat therebetween for engagement with circumferentially spaced points on the periphery of the work piece to support the work piece for precision grinding thereof, means for urging the work piece in the direction of the regulating wheel to insure proper initial positioning of the work and frictional engagement of the regulating wheel thereby, means for limiting the extent of said urge and an internal grinding wheel projecting into the work receiving throat for grinding the interior of a work piece while on the rest and urged toward the regulating wheel.

5. An internal grinder, including a grinding wheel for internal engagement with a work piece, means frictionally engaging the exterior of the work piece in opposition to the grinding member for urging the work piece into engagement with the grinding member, means for rotating the friction engaging member to impart a constant and uniform rotating movement to the work piece, and means for definitely varying the separation of the friction member and the grinding member to control the amount of stock internally removed from the work piece.

6. An internal grinder, including spaced members providing a work receiving throat for exterior engagement with a work piece, means for rotating one of said members to frictionally impart a rotating movement to the work piece, a grinding member projecting into the throat for internal engagement with a work piece supported therein, and means for shifting one of the throat forming members to press the work against the grinding wheel.

7. An internal grinder, including spaced members providing a work receiving throat for exterior engagement with a work piece, means for rotating one of said members to frictionally impart a rotating movement to the work piece, a grinding member projecting into the throat for internal engagement with a work piece supported therein, and means for imparting relative lateral movement to the grinding member and one of the throat forming members to operatively associate the work and grinding member.

8. An internal grinder including spaced members providing a work receiving throat for exterior engagement with a work piece, means for rotating one of said members to frictionally impart a rotating movement to the work piece, a grinding member projecting into the throat for internal engagement with a work piece supported therein, means for imparting relative lateral movement to the grinding member and one of the throat forming members to operatively associate and disengage the work and grinding member, and means for ejecting a disengaged work piece.

9. A grinding machine for precision generation of an inner surface of revolution of a tubular work piece, including a work support, a regulating wheel spaced therefrom, said parts being disposed to engage the outer periphery of a work piece at circumferentially spaced points and providing a throat for reception of said work piece, a grinding member projecting intermediate said parts for internal engagement with a work piece supported thereby, and additional means for urging a work piece in the direction of the regulating wheel.

10. An internal grinder, including a work support, a regulating wheel spaced therefrom, a grinding member projecting intermediate said parts for internal engagement with a work piece supported thereby, means for resiliently urging a work piece in the direction of the regulating wheel, means for limiting the amount of said resilient urge of the work piece, and means for opening the grinding throat, an amount sufficient to release the work from said resilient urge.

11. An internal grinder, including a work support, a regulating wheel spaced therefrom, a grinding member projecting intermediate said parts for internal engagement with a work piece supported thereby, means for resiliently urging a work piece in the direction of the regulating wheel, means for limiting the amount of said resilient urge of the work piece, means for opening the grinding throat, and means for ejecting a work piece upon opening of the grinding throat.

12. An internal grinder, including a work rest and an opposed regulating wheel forming a work receiving throat for exterior engagement with the peripheral surface of a ring tube or the like, a grinding wheel disposed in spaced relation to the parts forming said throat and in opposition thereto for engagement with the inner surface of the article peripherally supported by said parts, means for varying the relative position of said members to cause operative engagement of the work by the grinding wheel and to release it from engagement therewith and means for causing the grinding wheel to internally traverse the work while the parts are in grinding relation.

13. A machine for precision generation of the inner surface of a ring tube or the like in prescribed relation to the outer peripheral surface thereof, including opposed grinding and regulating wheels for engagement respectively internally and exteriorly with a work piece, a work support for exteriorly engaging the work piece and steadying same during the grinding thereof disposed in fixed relation to one of said wheels, and means for relatively shifting the other of said wheels and the rest during the grinding operation to operatively associate the grinding wheel and work.

14. A machine for precision generation of the inner surface of a ring tube or the like in predetermined relation to the outer periphery of said work piece, including opposed grinding and regulating wheels for engagement respectively internally and exteriorly with the work piece, a work support for exteriorly engaging the periphery of the work piece and steadying same during the grinding thereof disposed in fixed relation to one of said wheels, means for relatively shifting the other of said wheels and the rest during the grinding operation to operatively associate the grinding wheel and work, and means for imparting a relative traversing movement to the work and grinding wheel during operative engagement therebetween.

15. An internal grinder, including opposed grinding and regulating wheels for engagement respectively internally and exteriorly with a work piece, work support for laterally exteriorly engaging the work piece and steadying same during the grinding thereof disposed in fixed relation to one of said wheels, and means for relatively shifting the other of said wheels and the rest during the grinding operation to operatively associate the grinding wheel and work, means for imparting a relative traversing movement to the work and grinding wheel during operative engagement therebetween, means for separating the grinding wheel and the work, and means for ejecting the released work.

16. A machine for grinding tubular work pieces, including a pair of rotary wheels for simultaneous engagement with the interior and exterior surfaces of the work piece, at least one of said wheels being formed from abrasive material, means for rotating one of the wheels at a high grinding rate of speed for proper stock removal from the work piece and the other of the wheels at a slow regulating rate of surface speed whereby one of said wheels will perform a grinding action on the work piece and the other of said wheels will establish a constant and uniform rate of rotation therefor, and means for varying the separation of the wheels during grinding to determine the final wall thickness of the work piece.

17. A precision grinding machine for the production of tubular work pieces of uniform wall thickness comprising a rotary member having a non-yielding surface interiorly engaging the wall of the work piece, a second member having a non-yielding surface exteriorly engaging the wall of the work piece and disposed in cooperative opposition to the first member, the surface of one of said members being of abrasive material, means for imparting movement to said abrasive member at a grinding rate to cause proper stock removal, means for advancing the surface of the other member at a work regulating rate of speed to control the rate of presentation of the surface to be ground to the grinding member, and means for accurately controlling the distance between the operative surfaces of said members to determine the final wall thickness.

18. A precision grinding machine for the production of tubular work pieces of uniform wall thickness comprising a rotary member having a non-yielding surface interiorly engaging the wall of the work piece, a second member having a non-yielding surface exteriorly engaging the wall of the work piece and disposed in cooperative opposition to the first member, the surface of one of said members being of abrasive material, means for imparting movement to said abrasive surface at a grinding rate to cause proper stock removal, means for advancing the surface of the other member at a work-regulating rate of speed to control the rate of presentation of the surface to be ground to the grinding member, a work rest carried by the machine and positioned to engage one of the cylindrical surfaces of the work to cooperate with the work regulating member in controlling the position of the work piece during grinding, and means for accurately controlling the distance between the operative surfaces of said members to determine the final wall thickness.

19. An internal grinder including a pair of work supporting members arranged to form a work receiving trough for peripheral engagement with a work piece gravitationally urged into frictional engagement therewith, means for imparting a rotary movement to one of said members to cause rotation of a work piece when inserted in the trough, a grinding wheel mounted for engagement in the bore of a tubular work piece when the same is supported in the trough, and means for shifting the work and grinding member one relative to the other to gradually bring the grinding member into operative engagement with the prerotated work whereby injury of the work surface on initial engagement of the grinding wheel and work is prevented.

20. A grinder for the formation of an internal cylindrical surface in definite relation to a preformed exterior surface of a work piece comprising bearing members for engaging the preformed exterior surface to position the work thereby, said bearing members including a work rest and a regulating wheel spaced therefrom to provide a work receiving trough, means for rotating the regulating wheel at a slow rate of speed to impart a constant and uniform rotation to a work piece within the trough, a grinding member for internal engagement with the work piece, and means for shifting the exterior and interior work engaging members one relative to the other to bring the operative surface of the grinding member into proper relation to the arc of the preformed exterior surface of the work as positioned by the exterior bearing members whereby the grinding wheel will reduce the work to a uniform wall thickness.

21. A machine for internal grinding of hollow work pieces including a work support, a regulating wheel cooperating with the support to provide a work receiving trough said parts being adapted to engage the preformed outer surface of a work piece and support the work piece in definite position as determined by said outer surface, a supplemental member for engaging the outer surface of the work, means for positively rotating the regulating wheel to impart a constant and uniform rotation to the work, one of said exterior work engaging members having its axis angularly related to the axis of the work whereby a feeding thrust component is created on joint rotation of the parts, means for limiting the movement of the work under the urge of said thrust component, an internal grinding member for operation on the bore of the work, and means for axially shifting the work supporting and grinding members one relative to the other during grinding, the co-action of the work stop and feeding thrust component preventing accidental relative axial movement of the work and its supporting members.

22. A machine for internal grinding of hollow cylindrical articles including a grinding member for interior engagement with the work piece, a work support for exterior engagement with the work piece, means for limiting axial movement of the work along the work support during grinding, and rotatable means exteriorly engaging the work in cooperation with the work support for frictionally engaging the work to impart a constant and uniform rotation thereto and to urge the work axially in the direction of said work limiting means.

23. A precision grinding machine for the formation of a cylindrical internal surface accurately concentric with the cylindrical outer surface of a work piece comprising a work rest and a rotary regulating wheel of sufficient rigidity to resist surface yield under normal grinding pressure, said parts forming a two point bearing for the exterior face of the work piece and definitely determining the position of the included arc of a work piece surface in engagement therewith, means for rotating said regulating wheel at a slow and uniform rate to frictionally impart constant and uniform rotation to a work piece in engagement therewith, a grinding wheel projectable into the bore of a work piece supported on said two point bearing at a point to engage the aforesaid included arc of the work piece, and means for shifting said grinding and regulating wheels one relative to the other whereby the determined position of the exterior arc of the work piece will be brought into predetermined relation to the operative portion of the grinding wheel to control the thickness of wall of work piece produced by action of the grinding wheel on the interior thereof.

24. A precision grinding machine for removal of stock from the inner surface of a tubular work piece comprising a work rest having a supporting surface for peripheral engagement with the outer surface of the tubular member, a regulating wheel for cooperative engagement with said surface said parts being arranged to cause the regulating wheel to engage the work to one side of the axial plane of the work normal to the surface of the work supporting rest at the point of contact of the work therewith, and a grinding member for operation upon the interior of the work piece said grinding member having its axis laterally displaced with respect to said axial plane of the work in the direction of the regulating wheel engagement with the work.

25. A machine for internal grinding of hollow cylindrical articles including a work support and a regulating wheel disposed in opposition to the work support and rotatable at a slow rate of speed to impart a constant and uniform rotation to a work piece on the support, a grinding wheel for internal engagement with the work piece, means for causing a relative reciprocation of the work supporting and work grinding members, and means for preventing accidental axial movement of the work including a stop member for terminal engagement with the work, the regulating wheel having its axis disposed at an angle to the work support and being rotated in a direction toward the work support whereby the regulating wheel when rotated will exert a feed component holding the work against the stop.

26. An internal centerless grinder, including a work support, a regulating wheel spaced therefrom, a grinding member projecting intermediate said parts for internal engagement with a work piece supported thereby, means for resiliently urging a work piece in the direction of the regulating wheel, and means for limiting the amount of said resilient urge of the work piece.

27. A grinding machine for the precision generation of the inner surface of a ring tube or the like in definite prescribed relation to the outer surface of the member, including a regulating wheel rotatable at a slow work controlling rate of speed for frictional engagement with the outer surface of the work piece to control the rate of rotation thereof, an internal grinding wheel rotatable at a high grinding rate of speed for engagement with the inner surface of the article, means supporting the parts in opposition one to the other whereby the grinding and regulating wheels contact with the work along the same axial plane thereof in opposition one to the other, and additional means for exteriorly engaging the periphery of the work piece and steadying the same during the grinding thereof.

28. A grinding machine for precision production of rings, tubes or the like of uniform wall thickness, including a work support for engagement with the peripheral surface of the work piece, a regulating wheel disposed adjacent the work support and rotatable at a slow work controlling rate of speed to determine the rate of circumferential movement of the work on the work support, a grinding wheel projectable within the work for engagement with the inner surface of the work piece, means supporting the grinding wheel in substantial opposition to the regulating wheel for direct inclusion of the wall of the work piece therebetween, and means for determining the separation of the opposed operative surfaces of the grinding and regulating wheels to control the final thickness of wall of the finished work piece.

29. A machine for precision generation of interior surfaces of revolution, including a bed, a first slideway thereon, a second slideway disposed in angular relation to the first, a carriage mounted on the first slideway, a grinding wheel unit supported by the carriage and including an overhanging spindle bearing an internal grinding wheel operable at a high grinding rate of speed, a work supporting unit carried by the second slideway and including a rigid work rest for peripheral exterior engagement with the surface of a work piece and a regulating wheel member for cooperation with the work rest, said regulating wheel being rotatable at a slow work controlling rate of speed, said parts being positioned and arranged to support a work piece with its hollow interior aligned with the orbit of movement of the periphery of the grinding wheel, means for traversing the grinding wheel carriage on its ways and means for shifting the work supporting unit in a direction toward the grinding wheel to urge the inner face of the work into operative engagement with the periphery of the grinding wheel.

30. A machine for precision generation of interior surfaces of revolution, including a bed, a first slideway thereon, a second slideway disposed in angular relation to the first, a carriage mounted on the first slideway, a grinding wheel unit supported by the carriage and including an overhanging spindle bearing an internal grinding wheel operable at a high grinding rate of speed, a work supporting unit carried by the second slideway and including a rigid work rest for peripheral exterior engagement with the surface of a work piece and a regulating wheel member for cooperation with the work rest, said regulating wheel being rotatable at a slow work controlling rate of speed, said parts being positioned and arranged to support a work piece with its hollow interior aligned with the orbit of movement of the periphery of the grinding wheel, means for traversing the grinding wheel carriage on its ways and means for automatically shifting the work supporting unit successively in a direction toward and from the grinding wheel to move the inner face of the work to be operated upon into engagement with the grinding wheel and to release the same from grinding contact therewith.

31. A machine for precision generation of interior surfaces of revolution, including a bed, a first slideway thereon, a second slideway disposed in angular relation to the first, a carriage mounted on the first slideway, a grinding wheel unit supported by the carriage and including an overhanging spindle bearing an internal grinding wheel operable at a high grinding rate of speed, a work supporting unit carried by the second slideway and including a rigid work rest for peripheral exterior engagement with the surface of a work piece and a regulating wheel member for cooperation with the work rest, said regulating wheel being rotatable at a slow work controlling rate of speed, said parts being positioned and arranged to support a work piece with its hollow interior aligned with the orbit of movement of the periphery of the grinding wheel, means for traversing the grinding wheel carriage on its ways, means for automatically shifting the work supporting unit successively in a direction toward and from the grinding wheel to move the inner face of the work to be operated upon into engagement with the grinding wheel and to release the same from grinding contact therewith, and means for automatically ejecting the supported work piece when the grinding contact is released.

32. A machine for precision grinding of the interior of a tubular work piece comprising a bed, a carriage slidably supported by the bed, a grinding wheel spindle mounted on the carriage and including an overhanging grinding wheel rotatable at a high grinding rate of speed for engagement with the interior of the work piece, means supported by the bed and disposed on opposite sides of the axis of the grinding wheel to support a work piece in operative relation to said wheel, said means including a work rest blade having an inwardly inclined work supporting surface for engagement with the periphery of the work piece and an opposed non-yielding regulating wheel rotatable at a slow rate of speed and in the direction of the work rest for frictional peripheral engagement with a work piece to control the rate of rotation thereof, means for effecting radial adjustment of the grinding and regulating wheels one with respect to the other, and additional means for automatically imparting a radial feeding movement of the parts one with respect to the other to vary their operative relation for a given adjustment of the parts.

33. A machine for precision grinding of the interior of a tubular work piece comprising a bed, a carriage slidably supported by the bed, a grinding wheel spindle mounted on the carriage and including an overhanging grinding wheel rotatable at a high grinding rate of speed for engagement with the interior of the work piece, means supported by the bed and disposed on opposite sides of the axis of the grinding wheel to support a work piece in operative relation to said wheel, said means including a work rest blade having an inwardly inclined work supporting surface for engagement with the periphery of the work piece and an opposed non-yielding regulating wheel rotatable at a slow rate of speed and in the direction of the work rest for frictional peripheral engagement with a work piece to control the rate of rotation thereof, means for effecting radial adjustment of the grinding and regulating wheels one with respect to the other, additional means for automatically imparting a radial feeding movement of the parts one with respect to the other to vary their operative relation for a given adjustment of the parts, and means for producing axial traversing movement between the work and grinding wheels when the parts are in operative engagement.

34. A machine for precision grinding of the interior of a tubular work piece comprising a bed, a carriage slidably supported by the bed, a grinding wheel spindle mounted on the carriage and including an overhanging grinding wheel rotatable at a high grinding rate of speed for engagement with the interior of the work piece, means supported by the bed and disposed on opposite sides of the axis of the grinding wheel to support a work piece in operative relation to said wheel, said means including a work rest blade having an inwardly inclined work supporting surface for engagement with the periphery of the work piece and an opposed non-yielding regulating wheel rotatable at a slow rate of speed and in the direction of the work rest for frictional peripheral engagement with a work piece to control the rate of rotation thereof, means for effecting radial adjustment of the grinding and regulating wheels one with respect to the other, additional means for automatically imparting a radial feeding movement of the parts one with respect to the other to vary their operative relation for a given adjustment of the parts, and means for producing axial traversing movement between the work and grinding wheels when the parts are in operative engagement and for effecting axial disengagement of the work and grinding wheels.

35. A machine for precision grinding of the interior of an article, including a bed, a grinding wheel spindle supported thereby, means on the bed adapted to support a tubular work piece for free rotation including a rigid work rest member for peripheral engagement with the exterior of the work piece, a spaced regulating wheel having its operative surface rotatable at a slow rate of speed for frictionally engaging the work piece to determine its position and rate of rotation as supported by the rest, and means for imparting to the grinding wheel a cyclic movement including a series of traversing movements with respect to the work and a subsequent axial withdrawal of the grinding wheel from the work.

36. A machine for precision grinding of the interior of an article, including a bed, a grinding wheel spindle supported thereby, means on the bed adapted to support a tubular work piece for free rotation including a rigid work rest member for peripheral engagement with the exterior of the work piece, a spaced regulating wheel having its operative surface rotatable at a slow rate of speed for frictionally engaging the work piece to determine its position and rate of rotation as supported by the rest, means for imparting to the grinding wheel a cyclic movement including a series of traversing movements with respect to the work and a subsequent axial withdrawal of the grinding wheel from the work, and means for limiting the axial movement of the work in the direction of withdrawal of the grinding wheel.

37. A machine for precision grinding of the interior of an article, including a bed, a grinding wheel spindle supported thereby, means on the bed adapted to support a tubular work piece for free rotation including a rigid work rest member for peripheral engagement with the exterior of the work piece, a spaced regulating wheel having its operative surface rotatable at a slow rate of speed for frictionally engaging the work piece to determine its position and rate of rotation as supported by the rest, means for imparting to the grinding wheel a cyclic movement including a series of traversing movements with respect to the work and a subsequent axial withdrawal of the grinding wheel from the work, and means for limiting the axial movement of the work in the direction of withdrawal of the grinding wheel, the regulating wheel having its axis angularly disposed as respects the axis of the work piece as determined by engagement of the work rest therewith whereby the regulating wheel will exert a feed component urging the work in the direction of said limiting means.

38. A machine for precision grinding of the interior of an article, including a bed, a grinding wheel spindle supported thereby, means on the bed adapted to support a tubular work piece for free rotation including a rigid work rest member for peripheral engagement with the exterior of the work piece, a spaced regulating wheel having its operative surface rotatable at a slow rate of speed for frictionally engaging the work piece to determine its position and rate of rotation as supported by the rest, means for imparting to the grinding wheel a cyclic movement including a series of traversing movements with respect to the work and a subsequent axial withdrawal of the grinding wheel from the work, means for limiting the axial movement of the work in the direction of withdrawal of the grinding wheel, the regulating wheel having its axis angularly disposed as respects the axis of the work piece as determined by engagement of the work rest therewith whereby the regulating wheel will exert a feed component urging the work in the direction of said limiting means, and means for positively ejecting a supported work piece.

39. In a machine for grinding the interior of tubular articles, the combination with a grinding wheel for operation on the interior of the work piece, of work supporting and positioning means for exterior engagement with the work piece including a work supporting blade and a plurality of rotatable members for co-operative engagement with the periphery of the work piece for determining its position on the blade, means for yieldably urging one of said rotatable members in the direction of the other for engagement of the work piece therebetween, and means for separating said members to relieve the work piece of their joint pressure thereagainst.

40. In a machine for grinding the interior of tubular articles, the combination with a grinding wheel for operation on the interior of the work piece, of work supporting and positioning means for exterior engagement with the work piece including a work supporting blade and a plurality of rotatable members for co-operative engagement with the periphery of the work piece for determining its position on the blade, means for yieldably urging one of said rotatable members in the direction of the other for engagement of the work piece therebetween, and means for separating said members to relieve the work piece of their joint pressure thereagainst, one of said rotatable members having its axis angularly related to the axis of rotation of the work piece whereby said member exerts a friction feed component tending to axially shift the work piece.

41. In a machine for grinding the interior of tubular articles the combination with a grinding wheel for operation on the interior of the work piece, of work supporting and positioning means for exterior engagement with the work piece including a work supporting blade and a plurality of rotatable members for co-operative engagement with the periphery of the work piece for determining its position on the blade, means for yieldably urging one of said rotatable members in the direction of the other for engagement of the work piece therebetween, means for separating said members to relieve the work piece of their joint pressure thereagainst, one of said rotatable members having its axis angularly related to the axis of rotation of the work piece whereby said member exerts a friction feed component tending to axially shift the work piece, and means associated with the work rest for limiting said axial movement of the work piece.

42. In a machine for grinding the interior of tubular articles, the combination with a grinding wheel for operation on the interior of the work piece, of work supporting and positioning means for exterior engagement with the work piece including a work supporting blade and a plurality of rotatable members for co-operative engagement with the periphery of the work piece for determining its position on the blade, means for yieldably urging one of said rotatable members in the direction of the other for engagement of the work piece therebetween, means for separating said members to relieve the work piece of their joint pressure thereagainst, and means operative to shift a work piece out of engagement with the rest when the pressure members are in work releasing relation.

43. A precision grinding machine of the nature disclosed including a bed, an internal grinding wheel spindle mounted thereon for reciprocation relative thereto, a grinding wheel carried thereby for engagement with the interior of a work piece, means adapted to support a work piece for rotation on its periphery as a determinate of its position with respect to the grinding wheel, said means including a slide movable on the bed, a work rest carried by the slide, a rotatable member carried by the slide in opposition to the work rest, said rotatable member having its operative surface moving at a slow work controlling rate of speed for frictionally engaging and controlling the rate of rotation of a work piece on the rest, said rotatable member being movable with and relative to the work rest for determining the operative engagement of the work piece with the grinding wheel, a second rotatable work engaging member carried by the slide and movable therewith and relative thereto and disposed in opposition to the first rotatable member, and means for effecting movement of the rotatable members one with respect to the other to effect their joint engagement with the work piece or alternatively to discontinue said joint engagement.

44. A precision grinding machine of the nature disclosed including a bed, an internal grinding wheel spindle mounted thereon for reciprocation relative thereto, a grinding wheel carried thereby for engagement with the interior of a work piece, means adapted to support a work piece for rotation on its periphery as a determinate of its position with respect to the grinding wheel, said means including a slide movable on the bed, a work rest carried by the slide, a rotatable member carried by the slide in opposition to the work rest, said rotatable member having its operative surface moving at a slow work controlling rate of speed for frictionally engaging and controlling the rate of rotation of a work piece on the rest, said rotatable member being movable with and relative to the work rest for determining the operative engagement of the work piece with the grinding wheel, a second rotatable work engaging member carried by the slide and movable therewith and relative thereto and disposed in opposition to the first rotatable member, and means for effecting movement of the rotatable members one with respect to the other to effect their joint engagement with the work piece or alternatively to discontinue said joint engagement, said rotatable members having their axes disposed in non-parallel relation whereby an axial thrust component is exerted by one of the members against the work during their joint rotative engagement therewith.

45. A semi-automatic machine for internal precision grinding of tubular articles, including a bed, an internal grinding wheel spindle supported by the bed, a high speed internal grinding wheel carried thereby for operative engagement with the interior of a work piece, means supporting the work piece in telescoping relation to the grinding wheel and spindle for rotation on its periphery comprising a work rest blade and a slowly rotating wheel having a non-yielding surface disposed in opposition to the blade for joint determination therewith of the position of a work piece having its periphery engaged by said parts, means for automatically effecting decrease of the separation between the grinding and regulating wheels to cause joint operative engagement of the wheels respectively with the inner and outer surfaces of the tubular work piece and for subsequently automatically separating the wheels to discontinue said joint operative engagement of the work thereby, and means automatically operable in timed relation to the relative movement of the wheels for dislodging a released work piece.

In testimony whereof I affix my signature.

SOL EINSTEIN.

DISCLAIMER 1,772,932.—*Sol Einstein*, Cincinnati, Ohio. GRINDING MACHINERY. Patent dated August 12, 1930. Disclaimer filed December 6, 1933, by the assignee, *The Heald Machine Company*.

Hereby enters this disclaimer to claims 1, 2, 3, 5, 6, 7, 9, 12, 13, 14, 16, 17, 18, 19, 20, 23, 24, 27, 28, 35, and 36 in said specification which are in the following words, to wit:

"1. A machine for precision grinding of the interior surface of a ring tube or the like including a work rest adapted to engage the outer surface of the article and support the same for free rotation upon said surface and an opposed regulating wheel having its operative surface moving in the direction of said work rest, said regulating wheel being disposed to engage the outer surface of the work piece and control the rotative movement of the work on the work rest, a grinding member disposed intermediate said wheel and rest for internal engagement with the work piece and means for relatively shifting the regulating wheel and the grinding member to bring the grinding member and the work into operative engagement.

"2. An internal grinder including a work rest and an opposed regulating wheel having its operative surface moving in the direction of said work rest, a grinding member disposed intermediate said wheel and rest for internal engagement with the work piece, means for relatively shifting the regulating wheel and the grinding member to bring the grinding member and work into operative engagement and means for reciprocating the grinding wheel and work one relative to the other during the grinding operation.

"3. An internal grinder including a work rest and an opposed regulating wheel having its operative surface moving in the direction of said work rest, a grinding member disposed intermediate said wheel and rest for internal engagement with the work piece, means for relatively shifting the regulating wheel and the grinding member to bring the grinding member and work into operative engagement, means for reciprocating the grinding wheel and work one relative to the other during the grinding operation, and means for relatively axially separating the grinding wheel and the work at the completion of said operation."

"5. An internal grinder, including a grinding wheel for internal engagement with a work piece, means frictionally engaging the exterior of the work piece in opposition to the grinding member for urging the work piece into engagement with the grinding member, means for rotating the friction engaging member to impart a constant and uniform rotating movement to the work piece, and means for definitely varying the separation of the friction member and the grinding member to control the amount of stock internally removed from the work piece.

"6. An internal grinder, including spaced members providing a work receiving throat for exterior engagement with a work piece, means for rotating one of said members to frictionally impart a rotating movement to the work piece, a grinding member projecting into the throat for internal engagement with a work piece supported therein, and means for shifting one of the throat forming members to press the work against the grinding wheel.

"7. An internal grinder, including spaced members providing a work receiving throat for exterior engagement with a work piece, means for rotating one of said members to frictionally impart a rotating movement to the work piece, a grinding member projecting into the throat for internal engagement with a work piece supported therein, and means for imparting relative lateral movement to the grinding member and one of the throat forming members to operatively associate the work and grinding member."

"9. A grinding machine for precision generation of an inner surface of revolution of a tubular work piece, including a work support, a regulating wheel spaced therefrom, said parts being disposed to engage the outer periphery of a work piece at circumferentially spaced points and providing a throat for reception of said work piece, a grinding member projecting intermediate said parts for internal engagement with a work piece supported thereby, and additional means for urging a work piece in the direction of the regulating wheel."

"12. An internal grinder, including a work rest and an opposed regulating wheel forming a work receiving throat for exterior engagement with the peripheral surface of a ring tube or the like, a grinding wheel disposed in spaced relation to the parts forming said throat and in opposition thereto for engagement with the inner surface of the article peripherally supported by said parts, means for varying the relative position of said members to cause operative engagement of the work by the grinding wheel and to release it from engagement therewith and means for causing the grinding wheel to internally traverse the work while the parts are in grinding relation.

"13. A machine for precision generation of the inner surface of a ring tube or the like in prescribed relation to the outer peripheral surface thereof, including opposed grinding and regulating wheels for engagement respectively internally and exteriorly with a work piece, a work support for exteriorly engaging the work piece and steadying same during the grinding thereof disposed in fixed relation to one of said wheels, and means for relatively shifting the other of said wheels and the rest during the grinding operation to operatively associate the grinding wheel and work.

"14. A machine for precision generation of the inner surface of a ring tube or the like in predetermined relation to the outer periphery of said work piece, including opposed grinding and regulating wheels for engagement respectively internally and exteriorly with the work piece, a work support for exteriorly engaging the periphery of the work piece and steadying the same during the grinding thereof disposed in fixed relation to one of said wheels, means for relatively shifting the other of said wheels and the rest during the grinding operation to operatively associate the grinding wheel and work, and means for imparting a relative traversing movement to the work and grinding wheel during operative engagement therebetween."

"16. A machine for grinding tubular work pieces, including a pair of rotary wheels for simultaneous engagement with the interior and exterior surfaces of the work piece, at least one of said wheels being formed from abrasive material, means for rotating one of the wheels at a high grinding rate of speed for proper stock removal from the work piece and the other of the wheels at a slow regulating rate of surface speed whereby one of said wheels will perform a grinding action on the work piece and the other of said wheels will establish a constant and uniform rate of rotation therefor, and means for varying the separation of the wheels during grinding to determine the final wall thickness of the work piece.

"17. A precision grinding machine for the production of tubular work pieces of uniform wall thickness comprising a rotary member having a non-yielding surface interiorly engaging the wall of the work piece, a second member having a non-yielding surface exteriorly engaging the wall of the work piece, and disposed in cooperative opposition to the first member, the surface of one of said members being of abrasive material, means for imparting movement to said abrasive member at a grinding rate to cause proper stock removal, means for advancing the surface of the other member at a work regulating rate of speed to control the rate of presentation of the surface to be ground to the grinding member, and means for accurately controlling the distance between the operative surfaces of said members to determine the final wall thickness.

"18. A precision grinding machine for the production of tubular work pieces of uniform wall thickness comprising a rotary member having a non-yielding surface interiorly engaging the wall of the work piece, a second member having a non-yielding surface exteriorly engaging the wall of the work piece, and disposed in cooperative opposition to the first member, the surface of one of said members being of abrasive material, means for imparting movement to said abrasive surface at a grinding rate to cause proper stock removal, means for advancing the surface of the other member at a work-regulating rate of speed to control the rate of presentation of the surface to be ground to the grinding member, a work rest carried by the machine and positioned to engage one of the cylindrical surfaces of the work to cooperate with the work regulating member in controlling the position of the work piece during grinding, and means for accurately controlling the distance between the operative surfaces of said members to determine the final wall thickness.

"19. An internal grinder including a pair of work supporting members arranged to form a work receiving trough for peripheral engagement with a work piece gravitationally urged into frictional engagement therewith, means for imparting a rotary movement to one of said members to cause rotation of a work piece when inserted in the trough, a grinding wheel mounted for engagement in the bore of a tubular work piece when the same is supported in the trough, and means for shifting the work and grinding member one relative to the other to gradually bring the grinding member into operative engagement with the prerotated work whereby injury of the work surface on initial engagement of the grinding wheel and work is prevented.

"20. A grinder for the formation of an internal cylindrical surface in definite relation to a preformed exterior surface of a work piece comprising bearing members for engaging the preformed exterior surface to position the work thereby, said bearing members including a work rest and a regulating wheel spaced therefrom to provide a work receiving trough, means for rotating the regulating wheel at a slow rate of speed to impart a constant and uniform rotation to a work piece within the trough, a grinding member for internal engagement with the work piece, and means for shifting the exterior and interior work engaging members one relative to the other to bring the operative surface of the grinding member into proper relation to the arc of the preformed exterior surface of the work as positioned by the exterior bearing members whereby the grinding wheel will reduce the work to a uniform wall thick- "23. A precision grinding machine for the formation of a cylindrical internal surface accurately concentric with the cylindrical outer surface of a work piece comprising a work rest and a rotary regulating wheel of sufficient rigidity to resist surface yield under normal grinding pressure, said parts forming a two point bearing for the exterior face of the work piece and definitely determining the position of the included arc of a work piece surface in engagement therewith, means for rotating said regulating wheel at a slow and uniform rate to frictionally impart constant and uniform rotation to a work piece in engagement wherewith, a grinding wheel projectable into the bore of a work piece supported on said two point bearing at a point to engage the aforesaid included arc of the work piece, and means for shifting said grinding and regulating wheels one relative to the other whereby the determined position of the exterior arc of the work piece will be brought into predetermined relation to the operative portion of the grinding wheel to control the thickness of wall of work piece produced by action of the grinding wheel on the interior thereof.

"24. A precision grinding machine for removal of stock from the inner surface of a tubular work piece comprising a work rest having a supporting surface for peripheral engagement with the outer surface of the tubular member, a regulating wheel for cooperative engagement with said surface said parts being arranged to cause the regulating wheel to engage the work to one side of the axial plane of the work normal to the surface of the work supporting rest at the point of contact of the work therewith, and a grinding member for operation upon the interior of the work piece said grinding member having its axis laterally displaced with respect to said axial plane of the work in the direction of the regulating wheel engagement with the work."

"27. A grinding machine for the precision generation of the inner surface of a ring tube or the like in definite prescribed relation to the outer surface of the member, including a regulating wheel rotatable at a slow work controlling rate of speed for frictional engagement with the outer surface of the work piece to control the rate of rotation thereof, an internal grinding wheel rotatable at a high grinding rate of speed for engagement with the inner surface of the article, means supporting the parts in opposition one to the other whereby the grinding and regulating wheels contact with the work along the same axial plane thereof in opposition one to the other, and additional means for exteriorly engaging the periphery of the work piece and steadying the same during the grinding thereof.

"28. A grinding machine for precision production of rings, tubes or the like of uniform wall thickness, including a work support for engagement with the peripheral surface of the work piece, a regulating wheel disposed adjacent the work support and rotatable at a slow work controlling rate of speed to determine the rate of circumferential movement of the work on the work support, a grinding wheel projectable within the work for engagement with the inner surface of the work piece, means supporting the grinding wheel in substantial opposition to the regulating wheel for direct inclusion of the wall of the work piece therebetween, and means for determining the separation of the opposed operative surfaces of the grinding and regulating wheels to control the final thickness of wall of the finished work piece."

"35. A machine for precision grinding of the interior of an article, including a bed, a grinding wheel spindle supported thereby, means on the bed adapted to support a tubular work piece for free rotation including a rigid work rest member for peripheral engagement with the exterior of the work piece, a spaced regulating wheel having its operative surface rotatable at a slow rate of speed for frictionally engaging the work piece to determine its position and rate of rotation as supported by the rest, and means for imparting to the grinding wheel a cyclic movement including a series of traversing movements with respect to the work and a subsequent axial withdrawal of the grinding wheel from the work.

"36. A machine for precision grinding of the interior of an article, including a bed, a grinding wheel spindle supported thereby, means on the bed adapted to support a tubular work piece for free rotation including a rigid work rest member for peripheral engagement with the exterior of the work piece, a spaced regulating wheel having its operative surface rotatable at a slow rate of speed for frictionally engaging the work piece to determine its position and rate of rotation as supported by the rest, means for imparting to the grinding wheel a cyclic movement including a series of traversing movements with respect to the work and a subsequent axial withdrawal of the grinding wheel from the work, and means for limiting the axial movement of the work in the direction of withdrawal of the grinding wheel."

[*Official Gazette December 26, 1933.*]